United States Patent
Prasad et al.

(10) Patent No.: US 10,640,661 B2
(45) Date of Patent: May 5, 2020

(54) COALESCING AGENT FOR THREE-DIMENSIONAL (3D) PRINTING

(71) Applicant: Hewlett-Packard Development Company, L.P., Houston, TX (US)

(72) Inventors: Keshava A. Prasad, San Marcos, CA (US); Ali Emamjomeh, San Diego, CA (US); Glenn Thomas Haddick, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 306 days.

(21) Appl. No.: 15/511,543

(22) PCT Filed: Sep. 29, 2014

(86) PCT No.: PCT/US2014/058091
§ 371 (c)(1),
(2) Date: Mar. 15, 2017

(87) PCT Pub. No.: WO2016/053248
PCT Pub. Date: Apr. 7, 2016

(65) Prior Publication Data
US 2017/0247552 A1 Aug. 31, 2017

(51) Int. Cl.

| | | |
|---|---|---|
| *C09D 11/03* | (2014.01) | |
| *B33Y 70/00* | (2020.01) | |
| *C08L 101/00* | (2006.01) | |
| *C09D 11/324* | (2014.01) | |
| *C09D 11/38* | (2014.01) | |
| *C09D 11/10* | (2014.01) | |
| *B29C 64/00* | (2017.01) | |
| *B29C 64/165* | (2017.01) | |
| *B29C 64/386* | (2017.01) | |
| *B29C 64/40* | (2017.01) | |
| *B33Y 10/00* | (2015.01) | |
| *B33Y 30/00* | (2015.01) | |
| *B33Y 50/02* | (2015.01) | |
| *B33Y 80/00* | (2015.01) | |
| *B41J 2/045* | (2006.01) | |
| *B41M 5/00* | (2006.01) | |
| *C09D 11/033* | (2014.01) | |
| *C09D 11/037* | (2014.01) | |
| *C09D 11/102* | (2014.01) | |
| *C09D 11/107* | (2014.01) | |
| *C08K 3/04* | (2006.01) | |
| *B29K 77/00* | (2006.01) | |

(52) U.S. Cl.
CPC .............. *C09D 11/03* (2013.01); *B29C 64/00* (2017.08); *B29C 64/165* (2017.08); *B29C 64/386* (2017.08); *B29C 64/40* (2017.08); *B33Y 10/00* (2014.12); *B33Y 30/00* (2014.12); *B33Y 50/02* (2014.12); *B33Y 70/00* (2014.12); *B33Y 80/00* (2014.12); *B41J 2/0458* (2013.01); *B41M 5/0023* (2013.01); *C08L 101/00* (2013.01); *C09D 11/033* (2013.01); *C09D 11/037* (2013.01); *C09D 11/10* (2013.01); *C09D 11/102* (2013.01); *C09D 11/107* (2013.01); *C09D 11/324* (2013.01); *C09D 11/38* (2013.01); *B29K 2077/00* (2013.01); *C08K 3/04* (2013.01)

(58) Field of Classification Search
None
See application file for complete search history.

(56) References Cited

U.S. PATENT DOCUMENTS

| | | | |
|---|---|---|---|
| 6,436,180 | B1 | 8/2002 | Ma et al. |
| 6,500,248 | B1 | 12/2002 | Hayashi |
| 6,593,390 | B1 | 7/2003 | Johnson et al. |
| 7,192,474 | B2 | 3/2007 | Auslander et al. |
| 7,766,641 | B2 | 8/2010 | Silverbrook |
| 7,767,132 | B2 | 8/2010 | Patel et al. |
| 7,977,402 | B2 | 7/2011 | Madhusoodhanan et al. |
| 8,142,860 | B2 | 3/2012 | Vanmaele et al. |
| 8,455,570 | B2 | 6/2013 | Lindstrom et al. |
| 2005/0059757 | A1 | 3/2005 | Bredt et al. |

(Continued)

FOREIGN PATENT DOCUMENTS

| | | |
|---|---|---|
| CN | 1199761 | 11/1998 |
| CN | 1976799 | 6/2007 |

(Continued)

OTHER PUBLICATIONS

Block, S., "Disinfection, Sterilization, and Preservation", 2001, 3 pages, 5th Edition, Lippincott Williams and Wilkins, PA.
Whelan, T., "Polymer Technology Dictionary", 1994, 3 pages, First Edition, Springer Science+Business Media, B.V.
International Search Report and Written Opinion for International Application No. PCT/US2014/058091 dated Jun. 5, 2015, 13 pages.

*Primary Examiner* — Robert T Butcher
(74) *Attorney, Agent, or Firm* — Dierker & Kavanaugh PC

(57) ABSTRACT

A coalescing agent for three-dimensional (3D) printing includes a co-solvent, a surfactant having a hydrophilic lipophilic balance (HLB) value that is less than 10, a carbon black pigment, a polymeric dispersant, and a balance of water. The cosolvent is present in an amount ranging from about 15 wt % to about 30 wt % of a total wt % of the coalescing agent. The surfactant is present in an amount ranging from about 0.5 wt % to about 1.4 wt % of the total wt % of the coalescing agent. The carbon black pigment is present in an amount ranging from about 3.0 wt % to about 6.0 wt % of the total wt % of the coalescing agent. The polymeric dispersant has a weight average molecular weight ranging from about 12,000 to about 20,000.

18 Claims, 4 Drawing Sheets

(56) References Cited

U.S. PATENT DOCUMENTS

| | | | |
|---|---|---|---|
| 2005/0274281 A1* | 12/2005 | Jackson | C09D 11/30 106/31.43 |
| 2006/0055761 A1 | 3/2006 | Daems et al. | |
| 2007/0139476 A1 | 6/2007 | Schwartz et al. | |
| 2007/0238056 A1 | 10/2007 | Baumann | |
| 2009/0258196 A1 | 10/2009 | Nagashima et al. | |
| 2012/0172490 A1 | 7/2012 | Cai et al. | |
| 2012/0249661 A1* | 10/2012 | Tyrell | C09D 11/38 347/20 |
| 2012/0293582 A1 | 11/2012 | Goto et al. | |
| 2013/0038660 A1 | 2/2013 | Hasegawa et al. | |
| 2013/0068131 A1 | 3/2013 | Bermel et al. | |
| 2013/0072614 A1 | 3/2013 | Lindstrom | |
| 2014/0065378 A1 | 3/2014 | Xu | |

FOREIGN PATENT DOCUMENTS

| | | |
|---|---|---|
| CN | 101360799 | 2/2009 |
| CN | 101541549 | 9/2009 |
| CN | 102858890 | 1/2013 |
| CN | 103827233 | 5/2014 |
| EP | 0864620 | 9/1998 |
| JP | 2004291625 | 10/2004 |
| JP | 2013-203850 | 10/2013 |
| JP | 2014-133414 | 7/2014 |
| KR | 20060071340 | 6/2006 |

\* cited by examiner

COALESCING AGENT FOR THREE-DIMENSIONAL (3D) PRINTING

BACKGROUND

Three-dimensional (3D) printing is an additive printing process used to make three-dimensional solid objects from a digital model. 3D printing is often used in rapid product prototyping, mold generation, and mold master generation. 3D printing techniques are considered additive processes because they involve the combined application of successive layers of material. This is unlike traditional machining processes, which often rely upon the removal of material to create the final object. Materials used in 3D printing often require curing or fusing, which for some materials may be accomplished using heat-assisted extrusion or sintering, and for other materials may be accomplished using digital light projection technology.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
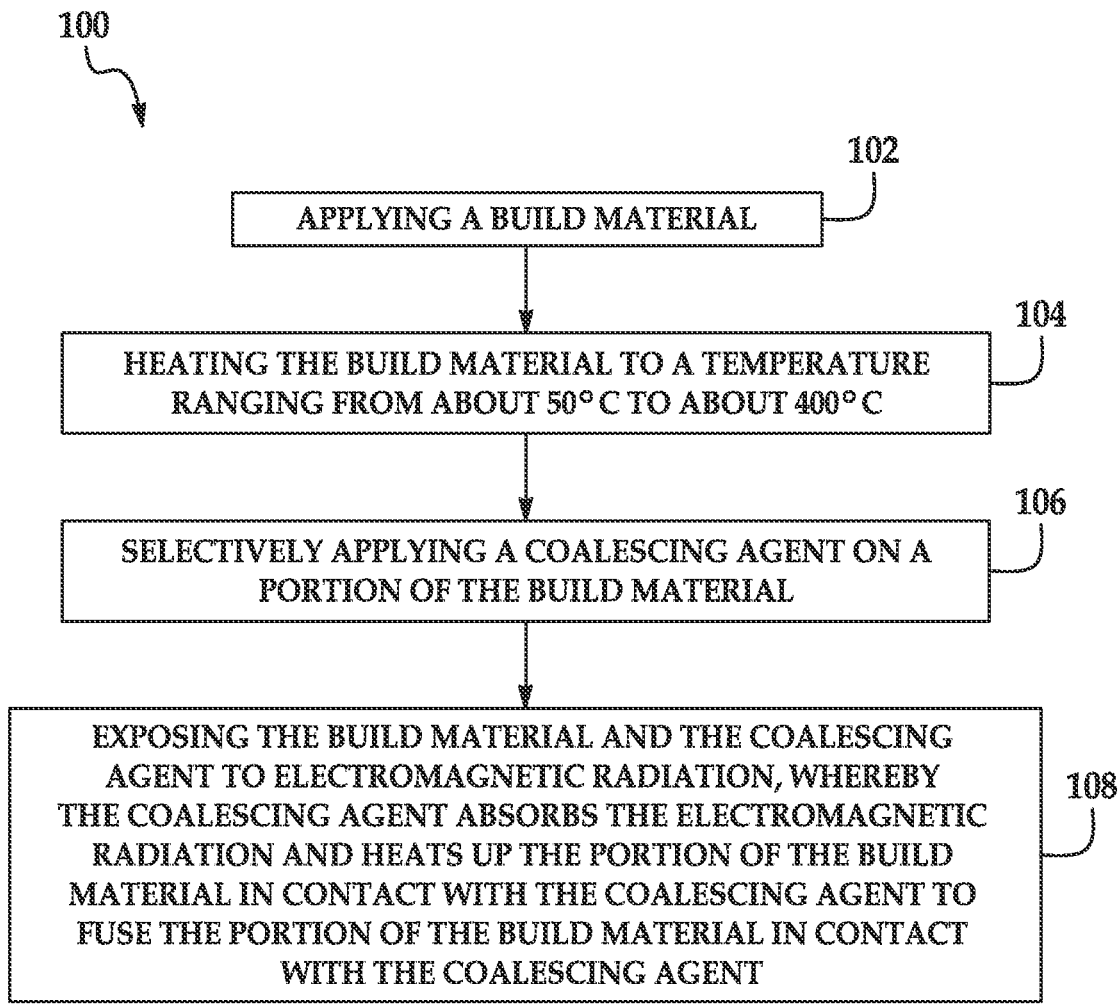
FIG. 1 is a flow diagram illustrating an example of a 3D printing method disclosed herein.

Examples of the coalescing agent disclosed herein are utilized in a three-dimensional (3D) printing system. This 3D printing system is based on a 3D fabrication process that involves the use of electromagnetic radiation for fusing a build material using the inkjet applied coalescing agent(s) to selectively define the 3D object/part in question (layer by layer). During this 3D fabrication process, an entire layer of a build material (e.g. a polyamide material or another suitable polymer) is exposed to the electromagnetic radiation, but only a selected region of the build material is fused and hardened to become a layer of the 3D object. The coalescing agent is selectively applied by an inkjet applicator so that the coalescing agent is in contact with the build material at the selected region. The coalescing agent includes a polymerically dispersed carbon black pigment, which improves the radiation absorbance efficiency at the selected region. The polymerically dispersed carbon black pigment is capable of converting the absorbed radiation to thermal energy, which in turn melts and/or sinters the build material that is in contact with the polymerically dispersed carbon black pigment. This causes the build material to fuse to form the layer of the 3D object.

In addition, the coalescing agent includes a co-solvent and a surfactant that enables the coalescing agent to spread relatively uniformly over the build material, due, at least in part, to the surfactant penetrating into the layer of the build material. The co-solvent has a boiling point lower than 300° C., and the surfactant has a hydrophilic lipophilic balance (HLB) less than 10. The coalescing agent, with these particular components, has a lower dynamic surface tension (i.e., the coalescing agent reaches an equilibrium surface tension of 26 dynes/cm within 10 milliseconds upon being applied). The lower the dynamic surface tension, the better the dot spread of the coalescing agent and the better the optical density of the resulting 3D object. This results in a 3D object with improved and more uniform cosmetic properties.

Using the coalescing agent disclosed herein, the resulting 3D object has improved mechanical properties (e.g., tensile strength, Young's modulus, % strain at break), for example, when compared to 3D objects formed with different coalescing agents including different co-solvents and an amphoteric surfactant with no designated HLB. In some examples, it is believed that the improved mechanical properties may be obtained even when less of the coalescing agent disclosed herein is utilized.

The coalescing agent disclosed herein is aqueous based, and includes a particular co-solvent and surfactant. As mentioned above, the aqueous nature and particular components of the coalescing agent enhance the wetting properties of the coalescing agent, even on the build material, which may be hydrophobic. This enables the polymerically dispersed carbon black pigment within the coalescing agent to be spread more uniformly over the build material surface.

In an example, the coalescing agent includes water (e.g., deionized water), the co-solvent having a boiling point less than 300° C., the surfactant having the HLB less than 10, and a polymerically dispersed carbon black pigment. The amount of water in the coalescing agent may vary depending upon the amounts of the other components, but the water makes up a balance of the coalescing agent (i.e., so a total wt % of the coalescing agent is 100).

As mentioned above, the co-solvent has a boiling point less than 300° C. In some examples, the co-solvent has a boiling point less than 250° C. Some examples of the co-solvent include 2-Pyrrolidinone, 1,5-Pentanediol, Triethylene glycol, Tetraethylene glycol, 2-methyl-1,3-propanediol, 1,6-Hexanedol, and Tripropylene glycol methyl ether. In the examples disclosed herein, it is to be understood that the coalescing agent includes one of the listed co-solvents alone, or two or more of the listed co-solvents in combination, and excludes other co-solvents. As such, if the co-solvent is 2-Pyrrolidinone, the co-solvent 2-Pyrrolidinone alone is included. In another example, if the co-solvent is a combination of 2-Pyrrolidinone and 1,5-Pentanediol, these solvents alone are included. The co-solvent may be present in the coalescing agent in an amount ranging from about 15 wt % to about 30 wt % based on the total wt % of the coalescing agent. In an example, the co-solvent may be present in the coalescing agent in an amount of about 25 wt % based on the total wt % of the coalescing agent.

Also as mentioned above, the surfactant has the HLB less than 10. This component contributes, at least in part, to the coalescing agent having the low dynamic surface tension (as defined hereinabove). Any surfactant having the HLB less than 10 may be used. In an example, the surfactant is a self-emulsifiable surfactant based on acetylenic diol chemistry (e.g., SURFYNOL® SE-F from Air Products and Chemical Inc.). In other examples, the surfactant is an ethoxylated low-foam wetting agent (e.g., SURFYNOL® 440 or SURFYNOL® CT-111 from Air Products and Chemical Inc.) or an ethoxylated wetting agent and molecular defoamer (e.g., SURFYNOL® 420 from Air Products and Chemical Inc.). Still other suitable surfactants with an HLB less than 10 include non-ionic wetting agents and molecular defoamers (e.g., SURFYNOL® 104E from Air Products and Chemical Inc.) or water-soluble, non-ionic surfactants (e.g., TERGITOL™ TMN-6 from The Dow Chemical Company). A fluorosurfactant may also be added to the surfactant having the HLB less than 10 in order to improve the wetting of the build material. As such, in another example, the coalescing agent includes a combination of the surfactant with the HLB less than 10 (e.g., the self-emulsifiable surfactant based on acetylenic diol chemistry) and a non-ionic fluororsurfactant (e.g., CAPSTONE® FS-35 from DuPont).

Whether a single surfactant is used or a combination of surfactants is used, the total amount of surfactant(s) in the coalescing agent may range from about 0.5 wt % to about 1.4 wt % based on the total wt % of the coalescing agent. In an example, the surfactant having the HLB less than 10 is included in an amount ranging from about 0.5 wt % to about 1.25 wt %, and the fluorosurfactant is included in an amount ranging from about 0.03 wt % to about 0.10 wt %.

An anti-kogation agent may be included in the coalescing agent. Kogation refers to the deposit of dried ink (e.g., coalescing agent) on a heating element of a thermal inkjet printhead. Anti-kogation agent(s) is/are included to assist in preventing the buildup of kogation. Examples of suitable anti-kogation agents include oleth-3-phosphate (e.g., commercially available as CRODAFOS™ O3A or CRODAFOS™ N-3 acid from Croda), or a combination of oleth-3-phosphate and a low molecular weight (e.g., <5,000) polyacrylic acid polymer (e.g., commercially available as CARBOSPERSE™ K-7028 Polyacrylate from Lubrizol). Whether a single anti-kogation agent is used or a combination of anti-kogation agents is used, the total amount of anti-kogation agent(s) in the coalescing agent may range from greater than 0.20 wt % to about 0.62 wt % based on the total wt % of the coalescing agent. In an example, the oleth-3-phosphate is included in an amount ranging from about 0.20 wt % to about 0.60 wt %, and the low molecular weight polyacrylic acid polymer is included in an amount ranging from about 0.005 wt % to about 0.015 wt %.

In the coalescing agent disclosed herein, the carbon black pigment acts as a radiation absorbing agent or active material. Examples of carbon black pigment include those manufactured by Mitsubishi Chemical Corporation, Japan (such as, e.g., carbon black No. 2300, No. 900, MCF88, No. 33, No. 40, No. 45, No. 52, MA7, MA8, MA100, and No. 2200B); various carbon black pigments of the RAVEN® series manufactured by Columbian Chemicals Company, Marietta, Ga., (such as, e.g., RAVEN® 5750, RAVEN® 5250, RAVEN® 5000, RAVEN® 3500, RAVEN® 1255, and RAVEN® 700); various carbon black pigments of the REGAL® series, the MOGUL® series, or the MONARCH® series manufactured by Cabot Corporation, Boston, Mass., (such as, e.g., REGAL® 400R, REGAL® 330R, and REGAL® 660R); and various black pigments manufactured by Evonik Degussa Corporation, Parsippany, N.J., (such as, e.g., Color Black FW1, Color Black FW2, Color Black FW2V, Color Black FW18, Color Black FW200, Color Black S150, Color Black S160, Color Black S170, PRINTEX® 35, PRINTEX® U, PRINTEX® V, PRINTEX® 140U, Special Black 5, Special Black 4A, and Special Black 4).

The carbon black pigment is polymerically dispersed in the coalescing agent by a polymeric dispersant having a weight average molecular weight ranging from about 12,000 to about 20,000. In some of the examples disclosed herein, the carbon black pigment is initially in the form of a water-based pigment dispersion. The water-based pigment dispersion includes the carbon black pigment (which is not surface treated), the polymeric dispersant, and water (with or without a co-solvent). When included, an example of the co-solvent may be 2-pyrollidinone. The polymeric dispersant may be any styrene acrylate or any polyurethane having its weight average molecular weight ranging from about 12,000 to about 20,000. Some commercially available examples of the styrene acrylate polymeric dispersant are JONCRYL® 671 and JONCRYL® 683 (both available from BASF Corp.). Within the water-based pigment dispersion, a ratio of the carbon black pigment to the polymeric dispersant ranges from about 3.0 to about 4.0. In an example, the ratio of the carbon black pigment to the polymeric dispersant is about 3.6. It is believed that the polymeric dispersant contributes to the carbon black pigment exhibiting enhanced electromagnetic radiation absorption.

The amount of the carbon black pigment that is present in the coalescing agent ranges from about 3.0 wt % to about 6.0 wt % based on the total wt % of the coalescing agent. In other examples, the amount of the carbon black pigment present in the coalescing agent ranges from greater than 4.0 wt % up to about 6.0 wt %. It is believed that these pigment loadings provide a balance between the coalescing agent 26 having jetting reliability and electromagnetic radiation absorbance efficiency. When the carbon black pigment is present in the water-based pigment dispersion, the amount of the water-based pigment dispersion that is added to the coalescing agent may be selected so that the amount of the carbon black pigment in the coalescing agent is within the given ranges.

The coalescing agent may also include a chelator, a biocide/anti-microbial, and/or combinations thereof. The chelator may be added in any amount ranging from about 0.03 wt % to about 0.10 wt % based on the total wt % of the coalescing agent. An example of a suitable chelator includes TRILON® (an aminopolycarboxylate, available from BASF Corp.). The biocide or antimicrobial may be added in any amount ranging from about 0.30 wt % to about 0.40 wt % with respect to the total weight of the coalescing agent. Examples of suitable biocides/anti-microbials include PROXEL™ GXL (an aqueous solution of 1,2-benzisothiazolin-3-one, available from Arch Chemicals, Inc.) and KORDEK™ MLK (a formaldehyde-free microbicide from The Dow Chemical Co.).

Examples of the coalescing agent disclosed herein may be used in any suitable 3D printing method and system. An example of the 3D printing method 100 is depicted in FIG. 1, and an example of the printing system 10 used in various steps of the method 100 is shown in FIGS. 2A through 2E. It is to be understood that each of the steps of the method 100 shown in FIG. 1 will be discussed in detail herein, and in some instances, FIGS. 2A through 2E will be discussed in conjunction with FIG. 1.

Figure 2A:
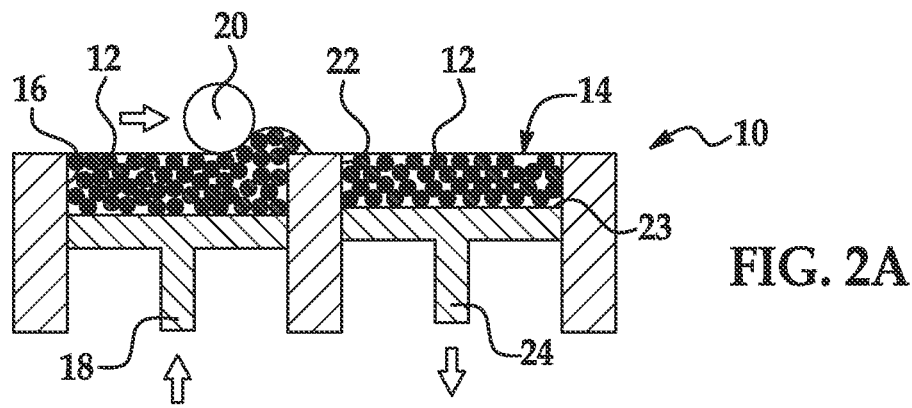
FIGS. 2A through 2D are cross-sectional views of the steps involved in forming one layer of a 3D object using an example of the 3D printing method disclosed herein.

As shown at reference number 102 in FIG. 1 and in FIG. 2A, an example of the method 100 includes applying a build material 12 using the 3D printing system 10. In the example shown in FIG. 2A, one layer 14 of the build material 12 has been applied, as will be discussed in more detail below.

The build material 12 may be a powder, a liquid, a paste, or a gel. Examples of the build material 12 include polymeric semi-crystalline plastic materials with a wide processing window of greater than 5° C. (i.e., the temperature range between the melting point and the re-crystallization temperature). In an example, the processing window ranges from 15° C. to about 30° C.

Examples of suitable build materials 12 include polyamides, polyethylene, polyethylene terephthalate (PET), and amorphous variations of these materials. Still other examples of suitable build materials 12 include polystyrene, polyacetals, polypropylene, polycarbonate, polyester, polyurethanes, other engineering plastics, and blends of any two or more of the polymers listed herein. Core shell polymer particles of these materials may also be used.

The build material 12 may have a melting point ranging from about 55° C. to about 450° C. Some specific examples of the build material 12 having their melting point within this range include nylon 11, nylon 12, nylon 6, nylon 8, nylon 9, nylon 66, nylon 612, nylon 812, nylon 912, etc. As examples, polyamide 12 (i.e., nylon 12) has a melting point of about 180°, polyamide 6 (i.e., nylon 6) has a melting point of about 220°, and polyamide 11 (i.e., nylon 11) has a melting point of about 200°.

The build material 12 may also be a modified polyamide. In an example, the modified polyamide material is an elastomeric modified polyamide that melts at a lower temperature than nylon 12.

When the build material 12 is in powder form, the polyamide build 12 may be made up of similarly sized particles (as shown in FIG. 2A) or differently sized particles. In an example, the build material 12 includes particles of three different sizes. In this example, the average size of the first particle is larger than the average size of the second particle, and the average size of the second polymer particle may be larger than the average size of the third polymer particle. The term "size", as used herein, refers to the diameter of a spherical particle, or the average diameter of a non-spherical particle (i.e., the average of multiple diameters across the non-spherical particle). In general, the average size of the particles of the build material 12 ranges from about 10 µm to about 100 µm. In some examples, the average size of the particles of the build material 12 ranges from about 40 µm to about 50 µm. As an example of the different sizes for each of the particles, the average size of the first particle may be greater than 50 µm, the average size of the second particle may be between 10 µm and 30 µm, and the average size of the third particle may be equal to or less than 10 µm. In an example, the first polyamide particle is present in an amount ranging from about 70 wt % to about 95 wt %, the second polyamide particle is present in an amount ranging from about 0.5 wt % to about 21 wt %, and the third polyamide particle is present in an amount ranging from greater than 0 wt % up to about 21 wt %.

It is to be understood that build material 12 may include, in addition to build material particles, a charging agent, a flow aid, or combinations thereof. Charging agent(s) may be added to suppress tribo-charging. Examples of suitable charging agent(s) include aliphatic amines (which may be ethoxylated), aliphatic amides, quaternary ammonium salts (e.g., behentrimonium chloride or cocamidopropyl betaine), esters of phosphoric acid, polyethylene glycol esters, or polyols. Some suitable commercially available charging agents include HOSTASTAT® FA 38 (natural based ethoxylated alkylamine), HOSTASTAT® FE2 (fatty acid ester), and HOSTASTAT® HS 1 (alkane sulfonate), each of which is available from Clariant Int. Ltd.). In an example, the charging agent is added in an amount ranging from greater than 0 wt % to less than 5 wt % based upon the total wt % of the build material particles.

Flow aid(s) may be added to improve the coating flowability of the build material 12. Flow aid(s) may be particularly desirable when the particles are less than 25 µm in size. The flow aid improves the flowability of the build material 12 by reducing the friction, the lateral drag, and the tribocharge buildup (by increasing the particle conductivity). Examples of suitable flow aids include tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminum silicate (E555), calcium aluminosilicate (E556), bentonite (E558), aluminum silicate (E559), stearic acid (E570), or polydimethylsiloxane (E900). In an example, the flow aid is added in an amount ranging from greater than 0 wt % to less than 5 wt % based upon the total wt % of the build material particles.

Referring back to FIG. 2A, the printing system 10 for forming the 3D object includes a supply bed 16 (including a supply of the build material 12), a delivery piston 18, a roller 20, a fabrication bed 22 (having a contact surface 23), and a fabrication piston 24. Each of these physical elements may be operatively connected to a central processing unit (not shown) of the printing system 10. The central processing unit (e.g., running computer readable instructions stored on a non-transitory, tangible computer readable storage medium) manipulates and transforms data represented as physical (electronic) quantities within the printer's registers and memories in order to control the physical elements to create the 3D object. The data for the selective delivery of the build material 12, the coalescing agent, etc. may be derived from a model of the 3D object to be formed.

The delivery piston 18 and the fabrication piston 24 may be the same type of piston, but are programmed to move in opposite directions. In an example, when a first layer of the 3D object is to be formed, the delivery piston 18 may be programmed to push a predetermined amount of the build material 12 out of the opening in the supply bed 16, and the fabrication piston 24 may be programmed to move in the opposite direction of the delivery piston 18 in order to increase the depth of the fabrication bed 22. The delivery piston 18 will advance enough so that when the roller 20 pushes the build material 12 into the fabrication bed 22 and onto the contact surface 23, the depth of the fabrication bed 22 is sufficient so that a layer 14 of the build material 12 may be formed in the bed 22. The roller 20 is capable of spreading the build material 12 into the fabrication bed 22 to form the layer 14, which is relatively uniform in thickness. In an example, the thickness of the layer 14 ranges from about 90 µm to about 110 µm, although thinner or thicker layers may also be used.

It is to be understood that the roller 20 may be replaced by other tools, such as a blade that may be desirable for spreading different types of powders, or a combination of a roller and a blade.

Figure 2B:
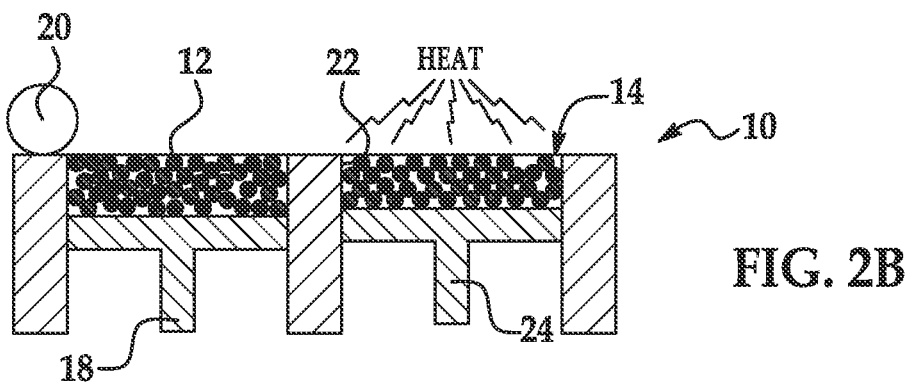

After the layer 14 of the build material 12 is introduced into the fabrication bed 22, the layer 14 is exposed to heating (as shown at reference number 104 in FIG. 1 and in FIG. 2B). Heating is performed to pre-heat the build material 12, and thus it is desirable that the heating temperature be below the melting point of the build material 12. As such, the heating temperature selected will depend upon the build material 12 that is used. As examples, the heating temperature may be from about 5° C. to about 20° C. below the melting point of the build material 12. In an example, the build material 12 is heated to a temperature ranging from about 50° C. to about 430° C. In an example in which the build material 12 is polyamide 12, the pre-heating temperature ranges from about 160° C. to about 170° C.

Pre-heating the layer 14 of the build material 12 may be accomplished using any suitable heat source that exposes all of the build material 12 in the fabrication bed 22 to the heat. Examples of the heat source include an electromagnetic radiation source, such as an infrared light source or near-infrared light source.

Figure 2C:
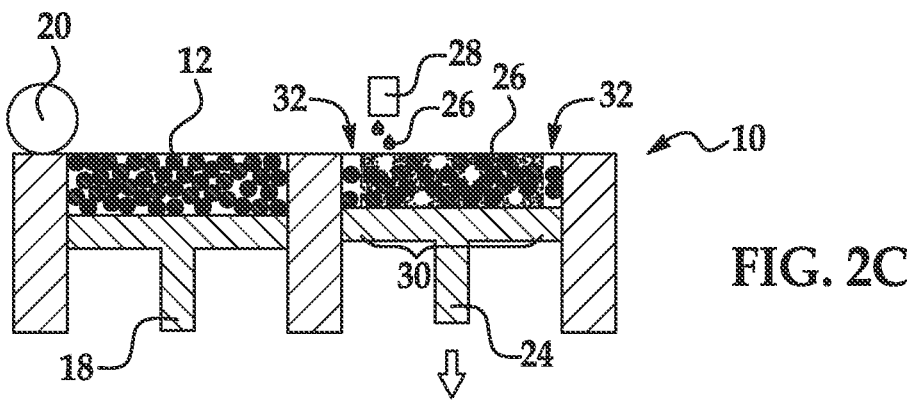
Figure 2D:
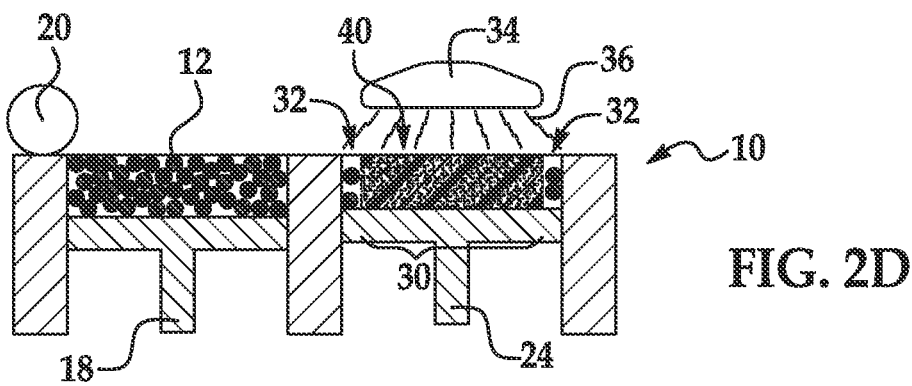

After pre-heating the layer 14, the previously described coalescing agent 26 is selectively applied on a portion of the build material 12 in the layer 14, as shown at reference number 106 in FIG. 1 and in FIG. 2C. As illustrated in FIG. 2C, the coalescing agent 26 may be dispensed from an inkjet applicator 28 (e.g., a thermal inkjet printhead or a piezoelectric inkjet printhead). While a single inkjet applicator 28 is shown in FIG. 2C, it is to be understood that multiple inkjet applicators may be used that span the width of the fabrication bed 22. The inkjet applicator(s) 28 may be attached to a moving XY stage or a translational carriage (neither of which is shown) that moves the inkjet applicator(s) 28 adjacent to the fabrication bed 22 in order to deposit the coalescing agent 26 in desirable area(s).

The inkjet applicator(s) 28 may be programmed to receive commands from the central processing unit and to deposit the coalescing agent 26 according to a pattern of a cross-section for the layer of the 3D object that is to be formed. As used herein, the cross-section of the layer of the object to be formed refers to the cross-section that is parallel to the contact surface 23. The inkjet applicator(s) 28 selectively applies the coalescing agent 26 on those portions of the layer 14 that are to be fused to become one layer of the 3D object. As an example, if the first layer is to be shaped like a cube or cylinder, coalescing agent 26 will be deposited in a square pattern or a circular pattern (from a top view), respectively, on at least a portion of the layer 14 of the build material 12. In the example shown in FIG. 2C, the coalescing agent 26 is deposited in a square pattern on the area or portion 30 of the layer 14 and not on the areas or portions 32.

In the example of the method 100 disclosed herein, a single coalescing agent 26 may be selectively applied to form the layer of the 3D object. It is to be understood that the amount of the coalescing agent 26 that is applied may be adjusted digitally to change the properties in the final product.

After the coalescing agent(s) 26 is/are selectively applied in the desired area(s) or portion(s) 30, the entire layer 14 of the build material 12 and the coalescing agent(s) 26 applied to at least a portion thereof are exposed to electromagnetic radiation. This is shown at step 108 in FIG. 1 and in FIG. 2D.

In an example, the electromagnetic radiation may be infrared or near-infrared radiation. The electromagnetic radiation is emitted from a radiation source 34, such as an IR or near-IR curing lamp, IR or near-IR light emitting diodes (LED), or lasers with the desirable electromagnetic wavelengths. In an example, the light source electromagnetic wavelengths range from about 100 nm (UV) to about 10 μm. In another example, the light source is a near-infrared light source with wavelengths of about 800 nm. In yet another example, the light source is an infrared light source with wavelengths of about 2 μm. The radiation source 34 may be attached, for example, to a carriage that also holds the inkjet applicator(s) 28. The carriage may move the radiation source 34 into a position that is adjacent to the fabrication bed 22. The radiation source 34 may be programmed to receive commands from the central processing unit and to expose the layer 14 and applied coalescing agent 26 to electromagnetic energy (e.g., IR or near-IR energy).

The length of time the radiation is applied for, or the energy exposure time, may be dependent, for example, on one or more of: characteristics of the radiation source 34; characteristics of the build material 12; and/or characteristics of the coalescing agent 26.

It is to be understood that variations in the fusing level may be achieved by altering (increasing or decreasing) the energy exposure time along the X, Y, and/or Z axes. As an example, if it is desirable that the level of fusing decrease along the Z axis, the radiation exposure time may be the highest in the first layer and decrease in subsequently formed layers. In yet another example, variations in the level of fusing may be achieved by altering (increasing or decreasing) the amount of coalescent agent 26 that is applied along the X, Y, and/or Z axes.

The coalescing agent 26 enhances the absorption of the electromagnetic energy, converts the absorbed electromagnetic to thermal energy, and promotes the transfer of the thermal heat to the build material 12 in contact with the coalescing agent 26 (i.e., in the area(s)/portion(s) 32). In an example, the coalescing agent 26 sufficiently elevates the temperature of the build material 12 in the area(s) 32 near or above its melting point, allowing fusing (which may include melting, sintering, binding, etc.) of the build material 12 to take place. In a specific example, the temperature is elevated about 50° C. above the melting temperature of the build material 12. The coalescing agent 26 may also cause, for example, heating of the build material 12 below its melting point but to a temperature suitable to cause softening and bonding. It is to be understood that area(s) 32 not having the coalescing agent 26 applied thereto absorb less energy, and thus the build material 12 within these area(s) 32 generally does not exceed the melting point and does not fuse. This forms one layer 40 of the 3D object 50 (FIGS. 2E and 3) to be formed.

As mentioned above, the exposure to the electromagnetic radiation fuses the build material 12 in the area(s) 32 to form the layer 40 of the 3D object 50. Steps 102 through 108 of FIG. 1 may be repeated as many times as desirable to create subsequent layers 42, 44, 46 (FIG. 2E) and to ultimately form the 3D object 50. It is to be understood that heat absorbed (during the application of energy) by a portion of the build material 12 on which coalescing agent 26 has been applied or has penetrated may propagate to a previously solidified layer, such as layer 40, causing at least some of that layer 40 to heat up above its melting point. This effect helps create strong interlayer bonding between adjacent layers (e.g., 40 and 42) of the 3D object 50.

Figure 2E:
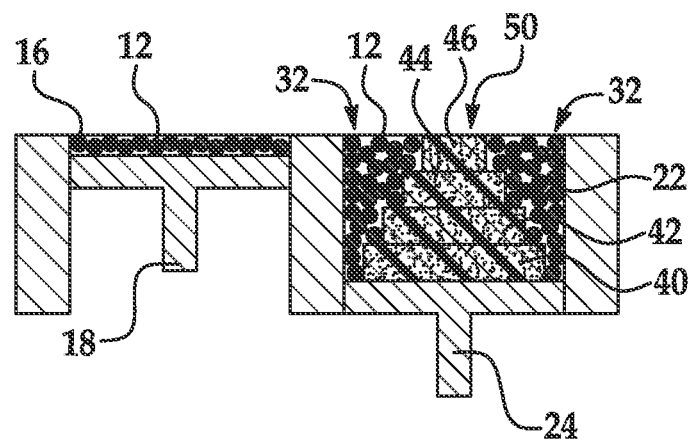
FIG. 2E is a cross-sectional view of an example of the 3D object that may be formed after performing the steps of FIGS. 2A through 2D several times.

FIG. 2E illustrates one example of the 3D object 50 formed in the fabrication bed 22. It is to be understood that the subsequently formed layers 42, 44, 46 may have any desirable shape and/or thickness and may be the same as, or different from any other layer 40, 42, 44, 46, depending upon the size, shape, etc. of the 3D object 50 that is to be formed.

As illustrated in FIG. 2E, as subsequent layers 42, 44, 46 have been formed, the delivery piston 18 is pushed closer to the opening of the delivery bed 16, and the supply of the build material 12 in the delivery bed 16 is diminished (compared, for example, to FIG. 2A at the outset of the method 100). The fabrication piston 24 is pushed further away from the opening of the fabrication bed 22 in order to accommodate the subsequent layer(s) of build material 12 and selectively applied coalescing agent 26. Since at least some of the build material 12 remains unfused after each layer 40, 42, 44, 46 is formed, the 3D object 50 is at least partially surrounded by the unfused build material 12 in the fabrication bed 22.

When the 3D object 50 is complete, it may be removed from the fabrication bed 22, and the unfused build material 12 remaining in the fabrication bed 22 may be reused depending, in part, on process conditions.

Figure 3:
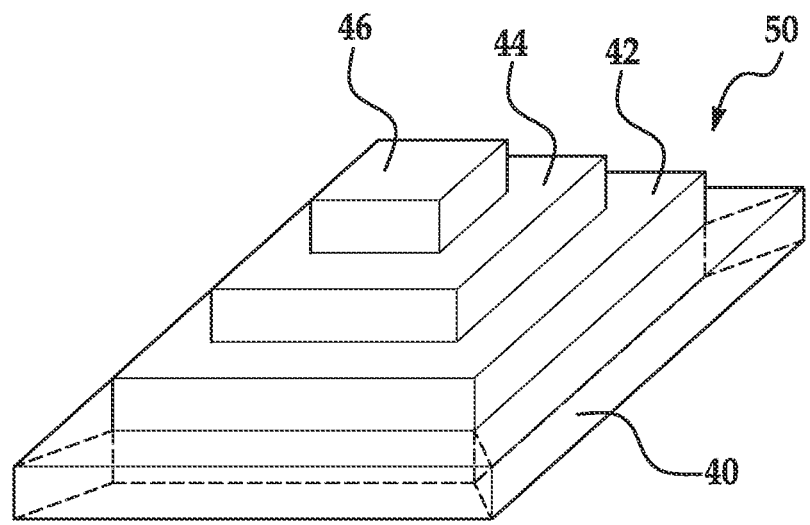
FIG. 3 is a perspective view of the 3D object of FIG. 2E.

FIG. 3 illustrates a perspective view of the 3D object 50. Each of the layers 40, 42, 44, 46 includes fused (melted, sintered, bonded, etc.) build material and at least some components of the coalescing agent 26 (i.e., those that have not evaporated).

Figure 4:
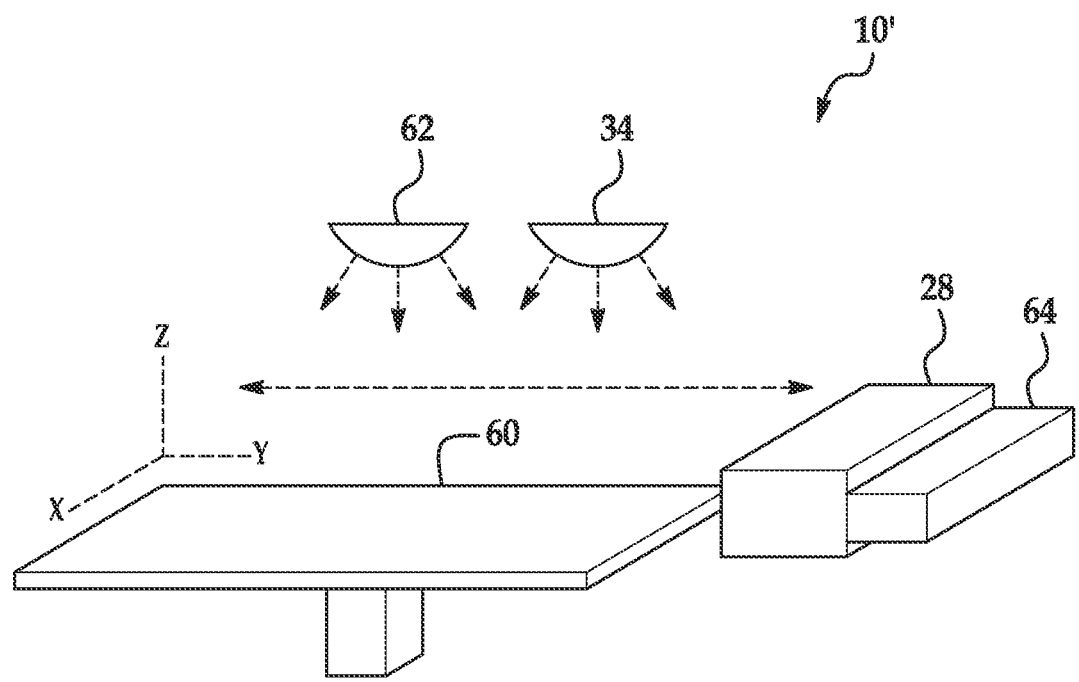
FIG. 4 is a simplified isometric view of an example of a 3D printing system that may be used in an example of the 3D printing method as disclosed herein.
Figure 4:
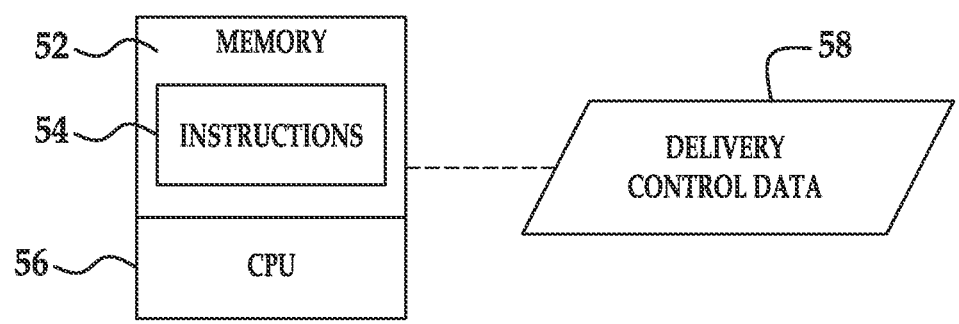

Referring now to FIG. 4, another example of the printing system 10' is depicted. The system 10' includes a central processing unit (CPU) 56 that controls the general operation of the additive printing system 10'. As an example, the central processing unit (CPU) 56 may be a microprocessor-based controller that is coupled to a memory 52, for example via a communications bus (not shown). The memory 52 stores the computer readable instructions 54. The central processing unit 56 may execute the instructions 54, and thus may control operation of the system 10' in accordance with the instructions 54.

In this example, the printing system 10' includes the inkjet applicator 28 to selectively deliver/apply the coalescing agent 26 to a layer 14 (not shown in this figure) of build material 12 provided on a support member 60. In an example, the support member 60 has dimensions ranging from about 10 cm by 10 cm up to about 100 cm by 100 cm, although the support member 60 may have larger or smaller dimensions depending upon the 3D object 50 that is to be formed.

The central processing unit 56 controls the selective delivery of the coalescing agent 26 to the layer 14 of the build material 12 in accordance with delivery control data 58.

In the example shown in FIG. 4, it is to be understood that the inkjet applicator 28 is a printhead, such as a thermal printhead or a piezoelectric inkjet printhead. The inkjet applicator 28 may be a drop-on-demand printhead or a continuous drop printhead.

The inkjet applicator 28 may be used to selectively deliver the coalescing agent 26 when in the form of a suitable fluid. As described above, the coalescing agent 26 includes an aqueous vehicle, such as water, the co-solvent, the surfactant, etc., to enable it to be delivered via the inkjet applicator 28.

In one example, the inkjet applicator 28 may be selected to deliver drops of the coalescing agent 26 at a resolution ranging from about 300 dots per inch (DPI) to about 1200 DPI. In other examples, the inkjet applicator 28 may be selected to be able to deliver drops of the coalescing agent 26 at a higher or lower resolution.

The inkjet applicator 28 may include an array of nozzles through which the inkjet applicator 28 is able to selectively eject drops of fluid. In one example, each drop may be in the order of about 10 pico liters (pl) per drop, although it is contemplated that a higher or lower drop size may be used. In some examples, inkjet applicator 28 is able to deliver variable size drops.

The inkjet applicator 28 may be an integral part of the printing system 10', or it may be user replaceable. When the inkjet applicator 28 is user replaceable, it may be removably insertable into a suitable distributor receiver or interface module (not shown).

In another example of the printing system 10', a single inkjet printhead may be used to selectively deliver different coalescing agents 26. For example, a first set of printhead nozzles of the printhead may be configured to deliver one of the coalescing agents 26, and a second set of printhead nozzles of the printhead may be configured to deliver the other of the coalescing agents 26.

As shown in FIG. 4, the inkjet applicator 28 has a length that enables it to span the whole width of the support member 60 in a page-wide array configuration. In an example, the page-wide array configuration is achieved through a suitable arrangement of multiple inkjet applicators 28. In another example, the page-wide array configuration is achieved through a single inkjet applicator 28 with an array of nozzles having a length to enable them to span the width of the support member 60. In other examples of the printing system 10', the inkjet applicator 28 may have a shorter length that does not enable them to span the whole width of the support member 60.

While not shown in FIG. 4, it is to be understood that the inkjet applicator 28 may be mounted on a moveable carriage to enable it to move bi-directionally across the length of the support member 60 along the illustrated Y-axis. This enables selective delivery of the coalescing agent 26 across the whole width and length of the support member 60 in a single pass. In other examples, the inkjet applicator 28 may be fixed while the support member 60 is configured to move relative thereto.

As used herein, the term 'width' generally denotes the shortest dimension in the plane parallel to the X and Y axes shown in FIG. 4, and the term 'length' denotes the longest dimension in this plane. However, it is to be understood that in other examples the term 'width' may be interchangeable with the term 'length'. As an example, the inkjet applicator 28 may have a length that enables it to span the whole length of the support member 60 while the moveable carriage may move bi-directionally across the width of the support member 60.

In examples in which the inkjet applicator 28 has a shorter length that does not enable it to span the whole width of the support member 60, the inkjet applicator 28 may also be movable bi-directionally across the width of the support member 60 in the illustrated X axis. This configuration enables selective delivery of the coalescing agent 26 across the whole width and length of the support member 60 using multiple passes.

The inkjet applicator 28 may include therein a supply of the coalescing agent 26, or may be operatively connected to a separate supply of the coalescing agent 26.

As shown in FIG. 4, the printing system 10' also includes a build material distributor 64. This distributor 64 is used to provide the layer (e.g., layer 14) of the build material 12 on the support member 60. Suitable build material distributors 64 may include, for example, a wiper blade, a roller, or combinations thereof.

The build material 12 may be supplied to the build material distributor 64 from a hopper or other suitable delivery system. In the example shown, the build material distributor 64 moves across the length (Y axis) of the support member 60 to deposit a layer of the build material 12. As previously described, a first layer of build material 12 will be deposited on the support member 60, whereas subsequent layers of the build material 12 will be deposited on a previously deposited (and solidified) layer.

It is to be further understood that the support member 60 may also be moveable along the Z axis. In an example, the support member 60 is moved in the Z direction such that as new layers of build material 12 are deposited, a predetermined gap is maintained between the surface of the most recently formed layer and the lower surface of the inkjet applicator 28. In other examples, however, the support member 60 may be fixed along the Z axis, and the inkjet applicator 28 may be movable along the Z axis.

Similar to the system 10, the system 10' also includes the radiation source 34 to apply energy to the deposited layer of build material 12 and the selectively applied coalescing agent 26 to cause the solidification of portion(s) 32 of the build material 12. Any of the previously described radiation sources 34 may be used. In an example, the radiation source 34 is a single energy source that is able to uniformly apply energy to the applied materials, and in another example, radiation source 34 includes an array of energy sources to uniformly apply energy to the deposited materials.

In the examples disclosed herein, the radiation source 34 is configured to apply energy in a substantially uniform manner to the whole surface of the deposited build material 12. This type of radiation source 34 may be referred to as an unfocused energy source. Exposing the entire layer to energy simultaneously may help increase the speed at which a three-dimensional object 50 may be generated.

While not shown, it is to be understood that the radiation source 34 may be mounted on the moveable carriage or may be in a fixed position.

The central processing unit 56 may control the radiation source 34. The amount of energy applied may be in accordance with delivery control data 58.

The system 10' may also include a pre-heater 62 that is used to pre-heat the deposited build material 12 (as shown and described in reference to FIG. 2B). The use of the pre-heater 62 may help reduce the amount of energy that has to be applied by the radiation source 34.

To further illustrate the present disclosure, examples are given herein. It is to be understood that these examples are provided for illustrative purposes and are not to be construed as limiting the scope of the present disclosure.

Example 1

A coalescing agent was prepared according to the examples disclosed herein. The formulation of the example coalescing agent is shown in Table 1. A comparative coalescing agent was also prepared. The formulation of the comparative coalescing agent is also shown in Table 1. The amounts are provided as weight percentages. The carbon black pigments were added to the formulation in the form of an aqueous dispersion (including water and a polymeric dispersant), but the amount provided in Table 1 represents the actual amount of the carbon black pigment.

TABLE 1

Example and Comparative Example Coalescing agents (CAs)

| Component Type | Component | Example CA 1 wt % | Comparative Example CA 1 wt % |
|---|---|---|---|
| Co-solvent | 2-pyrollidinone | 25 | 15 |
| | Ethoxylated Glycerol-1 (LEG-1) | 0 | 1.5 |
| | Glycerol | 0 | 2.5 |
| | Trimethylolpropane (EHPD) | 0 | 2.5 |
| | 1,5-Pentanediol | 0 | 2.5 |
| Surfactant | MACKAM ® CB35-ULS$^a$ | 0 | 0.1 |
| | CHEMGUARD ™ S550L-ULS$^{aa}$ | 0 | 0.012 |
| | CAPSTONE ® FS-35$^{aa}$ | 0.05 | 0 |
| | SURFYNOL ® SE-F$^{aaa}$ | 0.75 | 0 |
| Anti-Kogation Agent | CRODAFOS ™ O3A$^b$ | 0.5 | 0 |
| | CARBOSPERSE ™ K-7028 Polyacrylate$^{bb}$ | 0.01 | 0 |
| | JONCRYL ® 683$^{bbb}$ | 0 | 0.5 |
| Buffer | Tris Buffer | 0 | 0.2 |
| Chelator | TRILON ® M$^c$ | 0.04 | 0 |
| Biocide | PROXEL ™ GXL$^d$ | 0.14 | 0.2 |
| | KORDEK ™ MLK$^{dd}$ | 0.18 | 0 |
| Carbon Black Pigment | CB1$^e$ | 0 | 4.0 |
| | CB2$^{ee}$ | 5.0 | 0 |
| Water | Deionized water | balance | balance |

$^a$Amphoteric Coco-Betaine surfactant from Solvay Novacare, no designated HLB value
$^{aa}$Fluorosurfactants from Chemguard Inc. and DuPont, respectively
$^{aaa}$Self-emulsifiable surfactant based on acetylenic diol chemistry from Air Products and Chemical Inc.
$^b$Oleth-3-phosphate from Croda
$^{bb}$From Lubrizol
$^{bbb}$Styrene acrylate polymeric dispersant from BASF Corp. (100% active)
$^c$Aminopolycarboxylate from BASF Corp.
$^d$an aqueous solution of 1,2-benzisothiazolin-3-one available from Arch Chemicals, Inc.
$^{dd}$a formaldehyde-free microbicide from The Dow Chemical Co.
$^e$CB1 was a carbon black ink dispersion from Cabot, including a surface treated carbon black pigment (not polymerically dispersed)
$^{ee}$CB2 was a carbon black ink dispersion from Hewlett-Packard, including a non-surface treated carbon black pigment dispersed with JONCRYL ® 671

The example CA 1 and the comparative example CA 1 were used to form 3D objects with two different types of polyamide-12, namely PA2200 (available from Electro Optical Systems) and VESTOSINT X1556 (available from Evonik). A layer of each of the polyamide-12 (PA-12) materials was applied to a fabrication bed. To form an example PA2200 part, the example CA 1 was thermal inkjet printed with a 9 ng printhead in a pattern on a portion of the PA2200 layer, and was exposed to IR radiation. To form an example VESTOSINT X1556 part, the example CA 1 was thermal inkjet printed with a 9 ng printhead in a pattern on a portion of the VESTOSINT X1556 layer, and was exposed to IR radiation. To form a comparative example PA2200 part, the comparative example CA1 was thermal inkjet printed with a 9 ng printhead in a pattern on a portion of the PA2200 layer, and was exposed to IR radiation. To form a comparative example VESTOSINT X1556 part, the comparative example CA 1 was thermal inkjet printed with a 9 ng printhead in a pattern on a portion of the VESTOSINT X1556 layer, and was exposed to IR radiation. Each of the example CA 1 and the comparative example CA 1 was applied in the same amount in the XY direction and in the Z direction. The radiation exposure was about 5 inches per second.

The example PA2200 parts, the example VESTOSINT X1556 parts, the comparative example PA2200 parts, and the comparative example VESTOSINT X1556 parts were tested to determine various mechanical properties, including tensile strength, Young's modulus, % strain at yield, % strain at break, and % strain (break-yield). Each of the example parts and the comparative example parts was tested in the uniaxial tension using the method described in ASTM D638 ("Standard Test Method for Tensile Properties of Plastics"). The results are shown in Table 2.

TABLE 2

Mechanical Properties of Example and Comparative Example Parts

| Mechanical Properties | PA2200 parts | | VESTOSINT X1556 parts | |
|---|---|---|---|---|
| | Comparative CA 1 | Example CA1 | Comparative CA 1 | Example CA 1 |
| Tensile Strength (MPa) | | | | |
| XY | 44.2 | 45.3 | 37 | 42.3 |
| Z | 40.8 | 43.7 | Not tested | Not tested |
| Young's Modulus (MPa) | | | | |
| XY | 1609 | 1631 | 1201 | 1368 |
| Z | 1371 | 1528 | Not tested | Not tested |
| % Strain at Yield | | | | |
| XY | 0 | 9 | 9.4 | 11.2 |
| Z | 7.8 | 9.4 | Not tested | Not tested |

TABLE 2-continued

Mechanical Properties of Example and Comparative Example Parts

| Mechanical Properties | PA2200 parts | | VESTOSINT X1556 parts | |
|---|---|---|---|---|
| | Comparative CA 1 | Example CA1 | Comparative CA 1 | Example CA 1 |
| % Strain at Break | | | | |
| XY | 3.7 | 16 | 10 | 16.7 |
| Z | 8.1 | 10.3 | Not tested | Not tested |
| % Strain (Break-Yield) | | | | |
| XY | 0 | 6.8 | 0.6 | 5.5 |
| Z | 0.3 | 0.9 | Not tested | Not tested |

As shown in Table 2, in the XY and the Z directions, all of the mechanical properties of the example PA2200 part (made with example CA 1) were better than the mechanical properties of comparative example PA2200 part (made with comparative example CA 1). As such, both the XY and the Z axis strength were improved in the example PA2200 part.

Also as shown in Table 2, in the XY direction, all of the mechanical properties of the example VESTOSINT X1556 part were better than the mechanical properties of comparative example VESTOSINT X1556 part.

In addition, it is believed that the mechanical properties may be further improved by adjusting the amount of the example coalescing agent that is used.

Example 2

In order to test the effect of the pigment type used in the coalescing agent on the mechanical properties of the formed 3D object, three different carbon black pigment dispersions were used to make three different coalescing agents. The vehicle of the different coalescing agents was otherwise the same. It is noted that the vehicle did not include the surfactant having the HLB less than 10. One example coalescing agent was prepared (Example CA 2), and two comparative coalescing agents were prepared (Comparative Example CA 2 and 3). The carbon black pigment in comparative example CA 2 was CB1 from Example 1 (i.e., a surface treated carbon black pigment that was not polymerically dispersed). The carbon black pigment in comparative example CA 3 was a carbon black pigment polymerically dispersed with a styrene acrylate having a weight average molecular weight less than 12,000. The carbon black pigment in the Example CA 2 was CB2 from Example 1 (i.e., a carbon black pigment dispersed with JONCRYL® 671—a styrene acrylate having a weight average molecular weight of about 17,000). The formulations are shown in Table 3.

TABLE 3

Example and Comparative Example Coalescing agents

| Component Type | Component | Example CA 2 wt % | Comparative Example CA 2 wt % | Comparative Example CA 3 wt % |
|---|---|---|---|---|
| Co-solvent | 2-pyrollidinone | 16 | 16 | 16 |
| | Ethoxylated Glycerol-1 (LEG-1) | 1.5 | 1.5 | 1.5 |
| | Tetraethylene glycol | 2 | 2 | 2 |
| | 2-Methyl-1,3-Propanediol | 2 | 2 | 2 |
| Surfactant | CHEMGUARD ™ S550L-ULS[a] | 0.2 | 0.2 | 0.2 |
| | SURFYNOL® CT151[aa] | 0.15 | 0.15 | 0.15 |
| Binder | SMA 1440 K[b] | 0.7 | 0.7 | 0.7 |
| Buffer | Tris Buffer | 0.1 | 0.1 | 0.1 |

TABLE 3-continued

Example and Comparative Example Coalescing agents

| Component Type | Component | Example CA 2 wt % | Comparative Example CA 2 wt % | Comparative Example CA 3 wt % |
|---|---|---|---|---|
| Carbon Black | CB1[c] | 0 | 0 | 4.5 |
|  | CB3[cc] | 0 | 4.5 | 0 |
| Pigment | CB2[ccc] | 4.5 | 0 | 0 |
| Water | Deionized water | balance | balance | balance |

[a]Fluorosurfactants from Chemguard Inc.
[aa]Anionic surfactant from Air Products and Chemical Inc.
[b]Styrene Maleic anhydride polymer from Satomer Co.
[c]CB1 was a carbon black ink dispersion from Cabot, including a surface treated carbon black pigment (not polymerically dispersed)
[cc]CB3 was a carbon black ink dispersion from DIC Corp., including carbon black pigment polymerically dispersed with a styrene acrylate having a weight average molecular weight less than 12,000
[ccc]CB2 was a carbon black ink dispersion from Hewlett-Packard, including non-surface treated carbon black pigment dispersed with JONCRYL® 671

The example CA 2 and the comparative examples CA 2 and CA 3 were used to form 3D objects with polyimide-12. A layer of each of the polyimide-12 (PA-12) materials was applied to a fabrication bed. To form an example part, the example CA 2 was thermal inkjet printed with a 9 ng printhead in a pattern on a portion of the PA-12 layer, and was exposed to IR radiation. To form comparative example PA-12 parts, the comparative examples CA 2 AND CA 3 were respectively thermal inkjet printed with a 9 ng printhead in a pattern on a portion of the PA-12 layer, and were exposed to IR radiation. Each of the example CA 2 and the comparative examples CA 2 and CA 3 was applied in the same amount in the XY direction and in the Z direction. The radiation exposure was about 5 inches per second.

The example part and the comparative example parts were tested to determine various mechanical properties, including tensile strength, Young's modulus, and % strain at yield. Each of the example part and the comparative example parts was tested in the uniaxial tension using the method described in ASTM D638 ("Standard Test Method for Tensile Properties of Plastics"). The results are shown in Table 4. The mechanical properties along the Z axis were not tested.

TABLE 4

Mechanical Properties of Example and Comparative Example Parts

| Mechanical Properties | Example Part Example CA 2 | Comparative CA 2 | Comparative CA 3 |
|---|---|---|---|
| Tensile Strength (MPa) | | | |
| XY | 43.0 | 39.5 | 41.6 |
| Young's Modulus (MPa)* | | | |
| XY | 562 | 538 | 549 |
| % Strain at Yield | | | |
| XY | 20.9 | 13.0 | 15.9 |

*Numbers are lower than in Example 1 because the measurements were performed without an extensiometer The mechanical properties of the example part formed with CB2 were better than either of the parts formed with the other carbon black ink dispersions (CB1 and CB3). It is believed that the mechanical properties of parts formed with Example CA 2 may be even further enhanced by incorporating the surfactant having an HLB value that is less than 10.

Example 3

In order to test the effect of the anti-kogation agent level used in the coalescing agent on the mechanical properties of the formed 3D object, two different anti-kogation agent levels were used to make two different coalescing agents. One example coalescing agent was prepared (Example CA 3), and one comparative coalescing agent was prepared (Comparative Example CA 4). The formulations are shown in Table 5.

TABLE 5

Example and Comparative Example Coalescing agents

| Component Type | Component | Example CA 3 wt % | Comparative Example CA 4 wt % |
|---|---|---|---|
| Co-solvent | 2-pyrollidinone | 25 | 25 |
| Surfactant | CAPSTONE® FS-35[a] | 0.05 | 0.05 |
|  | SURFYNOL® SE-F[aa] | 0.75 | 0.75 |
| Anti-Kogation Agent | CRODAFOS™ O3A[b] | 0.5 | 0.2 |
|  | CARBOSPERSE™ K-7028 Polyacrylate[bb] | 0.01 | 0.01 |
| Chelator | TRILON® M[c] | 0.04 | 0.04 |
| Biocide | PROXEL™ GXL[d] | 0.14 | 0.12 |
|  | KORDEK™ MLK[dd] | 0.18 | 0.18 |
| Carbon Black Pigment | CB2[e] | 5.0 | 5.0 |
| Water | Deionized water | balance | balance |

[a]Fluorosurfactant from Chemguard Inc.
[aa]Self-emulsifiable surfactant based on acetylenic diol chemistry from Air Products and Chemical Inc.
[b]Oleth-3-phosphate from Croda
[bb]From Lubrizol
[c]Aminopolycarboxylate from BASF Corp.
[d]an aqueous solution of 1,2-benzisothiazolin-3-one available from Arch Chemicals, Inc.
[dd]a formaldehyde-free microbicide from The Dow Chemical Co.
[e]CB2 was a carbon black ink dispersion from Hewlett-Packard, including non-surface treated carbon black pigment dispersed with JONCRYL® 671

The example CA 3 and the comparative example CA 4 were used to form 3D objects with polyimide-12. A layer of each of the polyimide-12 (PA-12) materials was applied to a fabrication bed. To form an example part, the example CA 3 was thermal inkjet printed with a 9 ng printhead in a pattern on a portion of the PA-12 layer, and was exposed to IR radiation. To form comparative example PA-12 part, the comparative example CA 4 was thermal inkjet printed with a 9 ng printhead in a pattern on a portion of the PA-12 layer, and was exposed to IR radiation. Each of the example CA 3 and the comparative example CA 4 was applied in the same amount in the XY direction and in the Z direction. The radiation exposure was about 5 inches per second.

The example part and the comparative example part were tested to determine various mechanical properties, including tensile strength, Young's modulus, % strain at yield, % strain at break, and % strain (break-yield). Each of the example parts and the comparative example parts was tested in the uniaxial tension using the method described in ASTM D638 ("Standard Test Method for Tensile Properties of Plastics"). The results are shown in Table 6. The mechanical properties along the Z axis were not tested.

TABLE 6

Mechanical Properties of Example and Comparative Example Parts

| Mechanical Properties | PA-12 parts | |
|---|---|---|
| | Example CA3 | Comparative CA 4 |
| Tensile Strength (MPa) XY | 45.3 | 44.8 |
| Young's Modulus (MPa) XY | 1631 | 1491 |
| % Strain at Yield XY | 9.2 | 9.0 |
| % Strain at Break XY | 16 | 16 |
| % Strain (Break-Yield) XY | 6.8 | 7.1 |

As shown in Table 6, all of the mechanical properties, except for % strain (break-yield) of the example PA-12 part (made with example CA 3) were better than or equal to the mechanical properties of comparative example PA-12 part (made with comparative example CA 4). As such, the anti-kogation agent level may be included in a suitable amount in the coalescent agent disclosed herein in order to improve the mechanical properties of the 3D object.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 55° C. to about 450° C. should be interpreted to include not only the explicitly recited limits of about 55° C. to about 450° C., but also to include individual values, such as 57° C., 95° C., 125° C., 250° C., etc., and sub-ranges, such as from about 70° C. to about 325° C., from about 60° C. to about 170° C., etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it will be apparent that the disclosed examples may be modified. Therefore, the foregoing description is to be considered non-limiting.

What is claimed is:

1. A coalescing agent for three-dimensional (3D) printing a polymeric build material, the coalescing agent comprising:
   a co-solvent present in an amount ranging from about 21.5 wt % to about 30 wt % of a total wt % of the coalescing agent;
   a surfactant present in an amount ranging from about 0.5 wt % to about 1.4 wt % of the total wt % of the coalescing agent, the surfactant having a hydrophilic lipophilic balance (HLB) value that is less than 10;
   a carbon black pigment present in an amount ranging from about 3.0 wt % to about 6.0 wt % of the total wt % of the coalescing agent;
   a polymeric dispersant having a weight average molecular weight ranging from about 12,000 to about 20,000; and
   a balance of water.

2. The coalescing agent as defined in claim 1, further comprising a chelator present in an amount ranging from about 0.03 wt % to about 0.10 wt % of the total wt % of the coalescing agent.

3. The coalescing agent as defined in claim 1 wherein the polymeric dispersant is selected from the group consisting of a styrene acrylate and a polyurethane.

4. The coalescing agent as defined in claim 1 wherein the co-solvent has a boiling point of less than 300° C.

5. The coalescing agent as defined in claim 4 wherein the co-solvent is selected from the group consisting of 2-Pyrrolidinone, 1,5-Pentanediol, Triethylene glycol, Tetraethylene glycol, 2-methyl-1,3-propanediol, 1,6-Hexanedol, Tripropylene glycol methyl ether, and combinations thereof, and wherein the coalescing agent excludes other co-solvents.

6. The coalescing agent as defined in claim 1 wherein the surfactant is a self-emulsifiable surfactant based on acetylenic diol chemistry or includes a combination of a fluorosurfactant and a self-emulsifiable surfactant based on acetylenic diol chemistry.

7. The coalescing agent as defined in claim 1, further comprising an anti-kogation agent including a combination of a polyacrylic acid polymer and Oleth-3 Phosphate, and wherein the combination is present in an amount ranging from greater than 0.20 wt % to about 0.62 wt % of the total wt % of the coalescing agent.

8. A coalescing agent for three-dimensional (3D) printing a polymeric build material, the coalescing agent consisting of:
   a co-solvent present in an amount ranging from about 21.5 wt % to about 30 wt % of a total wt % of the coalescing agent;
   a surfactant present in an amount ranging from about 0.5 wt % to about 1.4 wt % of the total wt % of the coalescing agent, the surfactant having a hydrophilic lipophilic balance (HLB) value that is less than 10;
   an anti-kogation agent present in an amount ranging from greater than 0.20 wt % to about 0.62 wt % of the total wt % of the coalescing agent;
   a carbon black pigment present in an amount ranging from about 3.0 wt % to about 6.0 wt % of the total wt % of the coalescing agent;

a polymeric dispersant having a weight average molecular weight ranging from about 12,000 to about 20,000;
a chelator present in an amount ranging from about 0.03 wt % to about 0.10 wt % of the total wt % of the coalescing agent;
optionally a biocide; and
a balance of water.

9. The coalescing agent as defined in claim 8 wherein the biocide is present in the coalescing agent, and wherein the biocide is present in an amount ranging from about 0.30 wt % to about 0.40 wt % of the total wt % of the coalescing agent.

10. A layer of a 3D printed object, comprising:
a build material; and
a coalescing agent applied on a surface of at least some of the build material, the coalescing agent including:
    a co-solvent present in an amount ranging from about 21.5 wt % to about 30 wt % of a total wt % of the coalescing agent;
    a surfactant present in an amount ranging from about 0.5 wt % to about 1.4 wt % of the total wt % of the coalescing agent, the surfactant having a hydrophilic lipophilic balance (HLB) value that is less than 10;
    a carbon black pigment present in an amount ranging from about 3.0 wt % to about 6.0 wt % of the total wt % of the coalescing agent;
    a polymeric dispersant having a weight average molecular weight ranging from about 12,000 to about 20,000; and
    a balance of water.

11. The layer as defined in claim 10 wherein the build material is a polymer selected from the group consisting of polyamide, polyethylene, polyethylene terephthalate (PET), polystyrene, polyacetal, polypropylene, polycarbonate, polyester, polyurethanes, and blends thereof.

12. The layer as defined in claim 10 wherein the coalescing agent further includes:
    an anti-kogation agent present in an amount ranging from greater than 0.20 wt % to about 0.62 wt % of the total wt % of the coalescing agent;
    a chelator present in an amount ranging from about 0.03 wt % to about 0.10 wt % of the total wt % of the coalescing agent; and
    a biocide present in an amount ranging from about 0.30 wt % to about 0.40 wt % of the total wt % of the coalescing agent.

13. The layer as defined in claim 10 wherein the co-solvent has a boiling point of less than 300° C., and wherein the co-solvent is selected from the group consisting of 2-Pyrrolidinone, 1,5-Pentanediol, Triethylene glycol, Tetraethylene glycol, 2-methyl-1,3-propanediol, 1,6-Hexanedol, and Tripropylene glycol methyl ether.

14. The layer as defined in claim 10 wherein the surfactant is a self-emulsifiable surfactant comprising an acetylenic diol or includes a combination of a fluorosurfactant and a self-emulsifiable surfactant comprising an acetylenic diol.

15. The layer as defined in claim 10 wherein the polymeric dispersant is selected from the group consisting of styrene acrylate and polyurethane.

16. The coalescing agent as defined in claim 1 wherein the co-solvent is present in an amount of about 25 wt % based on the total wt % of the coalescing agent.

17. The coalescing agent as defined in claim 1 wherein the coalescing agent has a 10-ms dynamic surface tension of 26 dynes/cm.

18. The coalescing agent as defined in claim 8 wherein the coalescing agent has a 10-ms dynamic surface tension of 26 dynes/cm.

* * * * *